United States Patent [19]

Huettner et al.

[11] 4,112,304
[45] Sep. 5, 1978

[54] X-RAY CASSETTE WITH A WINDOW FOR ILLUMINATING PATIENT DATA

[75] Inventors: Robert Huettner, Heroldsbach, Thurn; Gerhard Kuetterer, Erlangen, both of Germany

[73] Assignee: Siemens Aktiengesellschaft, Berlin & Munich, Germany

[21] Appl. No.: 782,523

[22] Filed: Mar. 29, 1977

[30] Foreign Application Priority Data

Oct. 15, 1976 [DE] Fed. Rep. of Germany ....... 2646725

[51] Int. Cl.² .................................................. G03C 5/16
[52] U.S. Cl. ..................................... 250/476; 250/475
[58] Field of Search ................. 250/476, 475, 481; 355/40

[56] References Cited

U.S. PATENT DOCUMENTS 3,962,585  6/1976  Huttner et al. ........................ 250/476

FOREIGN PATENT DOCUMENTS 2,327,385  12/1974  Fed. Rep. of Germany ........... 250/476
2,415,423  10/1975  Fed. Rep. of Germany ........... 250/476

Primary Examiner—Alfred E. Smith
Assistant Examiner—B. C. Anderson
Attorney, Agent, or Firm—Hill, Gross, Simpson, Van Santen, Steadman, Chiara & Simpson

[57] ABSTRACT

An x-ray film cassette has a window for illuminating patient data and a slide movable over the window to shut out light. A counterpoise of ferromagnetic material is provided for locking the slide in a closed position and which can be released magnetically. The counterpoise is pivotably mounted about a tilt axis passing through its center of gravity. A spring member is provided for biasing the counterpoise such that an end face is positioned within the window to prevent movement of the slide.

9 Claims, 3 Drawing Figures

X-RAY CASSETTE WITH A WINDOW FOR ILLUMINATING PATIENT DATA

BACKGROUND OF THE INVENTION

The invention relates to an x-ray film cassette with a window for illuminating patient data and with a slide closing the window tightly against light, which can be locked in the closed position by a spring and unlocked magnetically.

Our U.S. Pat. No. 3,962,585 issued June 8, 1976 shows an x-ray film cassette with a window for illuminating patient data. The window can be sealed tightly against light with a slide. The slide is secured against inadvertent opening of the window and consequent exposure of the section of film behind it. On a side facing the window, it is provided with a ferromagnetic tongue which springs into the window opening and which locks the slide in the closed position. To open the window it is necessary to slide a magnet along the exterior of the window so that the spring tongue is drawn out from the window opening by the magnet and is moved into an open position on the slide. In this position, the slide can be opened and closed again together with the tongue attached to it. In those x-ray film cassettes which ensure per se efficient protection against inadvertent opening of the slide, there is nevertheless a disadvantage that the spring tongue can be opened by a short hard blow, such as may occur, for example, if the cassette is dropped on the floor. If, in such a case, the shock direction has a sufficiently large component both in the direction of vibration of the spring and also in the direction in which the slide is opened, the window may burst open. Because the possibility of coordinating the film sheet to a specific patient is thus lost, this is extremely awkward, particularly if the x-ray exposures have already been effected.

SUMMARY OF THE INVENTION

An object of this invention is to develop a window closure for an x-ray film cassette wherein any unintentional opening of the window is precluded. This window closure should moreover be adapted to fit the thin cassette wall as well as possible and at the same time should be producible at a reasonable price.

In an x-ray film cassette of this invention for locking a slide in the closed position there is coordinated a counterpoise of ferromagnetic material mounted pivotally about the axis of tilt passing through the center of gravity of the counterpoise and a spring pushing the counterpoise into the locking position. This method of construction has the particular advantage that the counterpoise which is supported at its center of gravity by the tilt axis, is completely weight balanced in every position of the cassette. This means that on dropping the cassette, the force of impact, no matter from what direction it comes, catches the counterpoise at the center of gravity without producing on it a torsional or pitching moment about the tilt axis. Thus, the slide is no longer released by a single impact.

A particularly simple construction results if, in accordance with the invention, the axis of tilt of the counterpoise is aligned parallel to the plane of the window and perpendicular to the direction of displacement of the slide. In this way it is possible to use the entire front edge of the counterpoise aligned parallel to the axis of tilt as a stop.

In a preferable development of the invention, the counterpoise may be attached to the side of the slide facing the window and may be pushed into the window opening in the locking position with the end face which is in front in the opening direction. This has the particular advantage that the ferromagnetic material of the counterpoise is attached to the slide and can be positioned for opening of the window by external magnetic forces. Moreover, this results in a sufficiently stable stop face of the counterpoise in the window opening.

DESCRIPTION OF THE PREFERRED EMBODIMENTS

Figure 1:
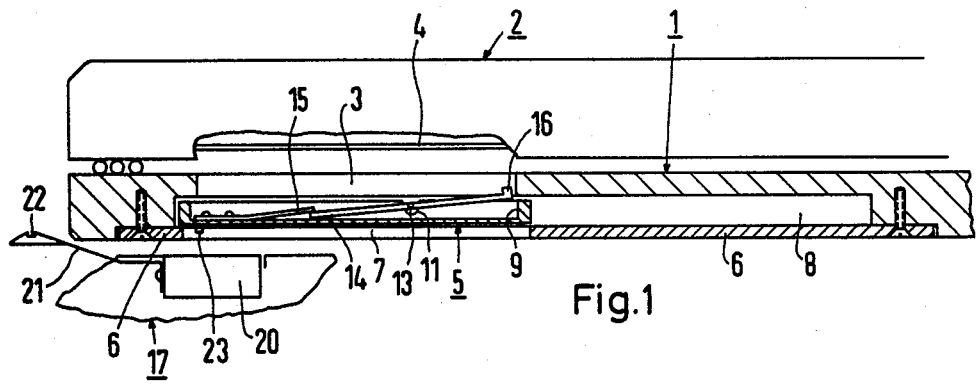
FIG. 1 is a side view through a section of a cassette wall with an inset window and a slide closing the window tightly against light.

FIG. 1 illustrates that part of a cassette cover 1 of an x-ray film cassette 2 in which there is inserted a window 3. The patient data on the x-ray film 4 lying in the cassette can be illuminated through this window. The window can be closed tightly against light by way of a slide 5 which can be moved in front of the window opening. The area of the cassette cover 1 in which the window 3 is located is covered on the cassette outer side with a frame-like panel 6 sunk flush in the cassette cover 1. This panel has a rectangular opening 7 which is a few millimeters larger than the window 3 in the cassette cover. The panel is attached to the cassette cover such that the opening 7 and the window 3 are located above one another. Set in between the frame-like panel 6 and the cassette cover 1 there is a rectangular cavity 8 matched in height and width to the slide, but in length projecting beyond the length of the slide by slightly more than the length of the window. The slide 5 is mounted in this cavity so as to be displaceable in a longitudinal direction. The slide has a recess 9 of trough-like shape on the inner side of the cassette. The width of the recess 9 is somewhat less than the width of the window opening. Approximately in the middle of the slide, the edge of the trough-shaped recess is provided on both sides with a groove 10 or 11, respectively, not quite extending to the base of the recess. In these grooves is inserted a see-saw like counterpoise or counter balance arm 14 of ferromagnetic material which is matched to the width of the recess and provided with two projections 12, 13 engaging in the grooves. The projections 12, 13 of the counterpoise 14 are disposed such that their connecting line cuts the center of gravity of the counterpoise. The width of the counterpoise without its projections is somewhat less than the width of the window 3 in the cassette cover 1.

Figure 2:
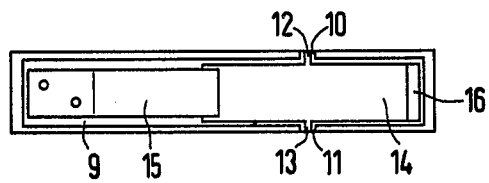
FIG. 2 shows a top view of a side of the slide which is facing the inside of the cassette.

As can be seen from FIGS. 1 and 2, a spring tongue 15 is riveted onto one end face of the trough-shaped recess of the slide. The length of the spring tongue 15 is such that it somewhat overlaps the edge of the counterpoise 14 facing it. Due to its initial stress, the spring tongue thereby presses this edge of the counterpoise against the base of the recess 9. The other end of the counterpoise is thus forced a few millimeters out of the recess of the slide 5 and into the opening of the window 3 in the cassette cover 1. The counterpoise 14 is so orientated relative to the recess of the slide 5 that, with complete closure of the window 3, its forced-out end can still just spring into the opening of the window. This end of the counterpoise 14, forced into the opening of the window, is provided with a projecting stop lug 16 for reinforcement. In the opened position of the slide, this stop lug 16 abuts the inner wall of the cavity 8 between the cassette cover and the frame-like panel 6 on the cover.

Figure 3:
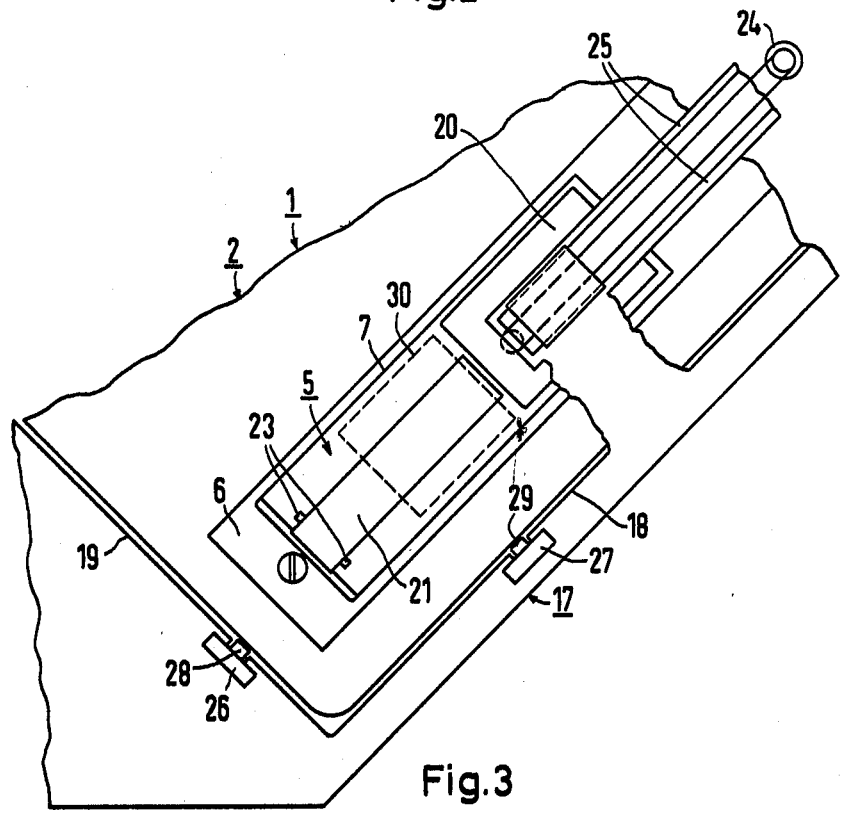
FIG. 3 is a view of an x-ray film cassette inserted in a patient data illumination device, a portion of which is illustrated.

FIG. 3 shows a view of the cassette in a data illumination device 17 shown in part. This data illumination device is provided with guides 18, 19 for the insertion of the x-ray film cassette 2. In front of the point at which the window of the x-ray film cassette 2 is located when the latter is fully inserted into the guides 18, 19 of the data illumination device 17, a permanent magnet 20 is incorporated in the side wall of the data illuminating device facing the window. In the example embodiment of FIG. 3, there is attached to the permanent magnet 20 a spring cam 21. This spring cam 21 is illustrated in FIG. 1 from the side, together with the permanent magnet 20. At its curved end it is provided with a groove 22 which is matched to the width of a step 23 mounted on the outer side of the slide 5, extending vertically to the direction of displacement. The permanent magnet, together with the spring cam 21, can be displaced in the data illuminating device 17 by way of a drive 24, here illustrated schematically, along a guide path 25. On the two guides 18, 19 for the x-ray film cassette 2 there is provided a sensing element 28 or 29, respectively, coupled with a switch 26 or 27 for the complete insertion of the x-ray film cassette 2. The switches 26, 27 are mutually connected in series to the drive 24 for the permanent magnet 20 and the spring cam 21. An optical system for the data illumination, not illustrated here, is adjusted to the position of the window 3 of the x-ray film cassette 2 when the cassette is fully inserted into the data illuminating device 17.

On complete insertion of the x-ray film cassette 2 into the illumination device 17, the window 3 is adjusted to the optical system of the data illumination device and the slide 5 closing the window is disposed below the permanent magnet 20 of the data illuminating device 17 such that the permanent magnet 20 is located exactly above the side of the counterpoise 14 dipping into the window opening of the cassette over 1. The side of the counterpoise 14 spring biased into the window 3 is thereby pushed by the magnetic field of the permanent magnet 20 out of the window 3 and pushed against the force of the spring tongue 15 into the recess 9 of the slide 5. The slide 5 is released in this position. Simultaneously the groove 22 of the spring cam 21 comes into engagement with the step 23 of the slide 5. As soon as the x-ray film cassette 2 is completely inserted into the guides 18, 19 of the data illuminating device 17, the two sensing elements 28, 29 actuate the two switches 26, 27. These switch on the drive 24 for the permanent magnet 20. The permanent magnet 20 with its magnetic field moves the counterpoise 14 on the slide 5. The window 3 is opened. In the example embodiment of FIG. 3, the spring cam 22 in engagement with the slide is connected to the permanent magnet 20. The magnet 20 supports the magnetic field on opening and subsequent closing of the slide 5. After illumination of the patient data, the magnet is moved back into its original position again by the drive 24. The slide is thereby locked again and the window closed. With the slide 5 completely closed, as the x-ray film cassette 2 is drawn out of the data illuminating device 17, the spring cam 21 with its groove 22 initially slides out of the step 23 of the slide 25 and, in the further course of movement, the magnetic field releases the counterpoise 14. The counterpoise can now be tilted into its locking position by the spring tongue 15. The side of the counterpoise 14 provided with the stop lug 16 is thereby pushed into the opening of the window 3. The window 3 is locked in this position. Since the counterpoise 14 is supported in the slide 5 at its center of gravity by the two projections 12, 13, sudden impacts effecting the cassette 2 are also unable to exert moment on the counterpoise 14. The slide remains locked. The slide also cannot be pushed open by pushing on the step 23 attached to the exterior of the slide.

It would also be possible for the permanent magnet 20 to be stationary in the data illumination device and for only the spring cam 21 to be moved by the drive 24. The magnetic displacement forces can be considerably increased if a further permanent magnet 30 is disposed on the opposite side of the cassette 2 inserted in the data illumination device 17, in coordination with the other side of the counterpoise. The position of such a second permanent magnet 30 relative to the window 3 is indicated in dashed lines in FIG. 2.

Although various minor modifications may be suggested by those skilled in the art, it should be understood that we wish to embody within the scope of the patent warranted hereon, all such embodiments as reasonably and properly come within the scope of our contribution to the art.

We claim as our invention:

1. An x-ray film cassette with a window for illuminating patient data and a slide sealing the window tightly against light, a spring means for locking the slide in a closed position and which can be released magnetically by positioning a magnet adjacent the slide, said spring means including a see-saw like lever arm of ferromagnetic material pivotably mounted about a tilt axis passing through the center of gravity of said lever arm and a spring biasing the lever arm into a position for locking the slide.

2. An x-ray film cassette according to claim 1, characterized in that the tilt axis of the lever arm is aligned parallel to the plane of the window and perpendicular to the direction of displacement of the slide.

3. An x-ray film cassette according to claim 1 in which the lever arm is attached to the side of the slide facing the window and that in the locking position an end face of the lever arm facing the direction of opening of the slide is biased into the window.

4. An x-ray film cassette according to claim 3, characterized in that the lever arm is provided with a projecting stop lug at said end face which is biased into the window.

5. An x-ray film cassette according to claim 1, characterized in that, for the purpose of magnetically opening the slide, the ferromagnetic material of the lever arm and its placement distance from the outer surface of the cassette wall are sufficient to overcome the friction of the slide in the wall of the x-ray film cassette when the slide is displaced by use of an external magnet which is moved along the cassette panel parallel to the slide in an opening direction.

6. An x-ray film cassette according to claim 1, characterized in that the slide is provided on its outer side with a step means aligned vertically to the direction of displacement of the slide for movement of the slide after a magnetic releasing.

7. An x-ray film cassette according to claim 1, characterized in that the lever arm in the closed position is biased in a milled slot of the slide.

8. An x-ray film cassette comprising:
 (a) a window for illuminating patient data on film in the cassette;
 (b) a slide movable in front of said window sealing the window tightly against light;
 (c) a recess in the slide on the side facing the film;
 (d) a see-saw like counterbalance arm in the recess having a tilt axis about which the arm is substantially balanced and which is parallel to the plane of the window;
 (e) a bias means deflecting one end of the counterbalance arm so as to cause the other end to extend above the recess and into the window for locking the slide; and
 (f) said counterbalance arm including a magnetically responsive material means for causing said counterbalance arm to deflect against the force of said bias means when a magnet is positioned near the magnetically responsive material means.

9. An x-ray film cassette system comprising:
 (a) a cassette having a window for illuminating patient data on film in the cassette;
 (b) a slide movable in front of said window sealing the window tightly against light;
 (c) a recess in the slide on the side facing the film;
 (d) a counterbalance arm in the recess having a tilt axis about which the arm is substantially balanced and which is parallel to the plane of the window;
 (e) a bias means deflecting one end of the counterbalance arm so as to cause the other end to extend above the recess and into the window for locking the slide;
 (f) said counterbalance arm including a magnetically responsive material means for causing said counterbalance arm to deflect against the force of said bias means when the magnetically responsive material means is positioned near a magnet; and
 (g) a patient data illumination device for receiving said cassette, said illumination device having sensing means for detecting when said cassette is fully inserted and a permanent magnet connected to a springable arm, said springable arm having means for aligning said permanent magnet adjacent the magnetically responsive material means.

* * * * *